(12) United States Patent
Watson et al.

(10) Patent No.: US 11,378,703 B1
(45) Date of Patent: Jul. 5, 2022

(54) RADIATION SENSITIVE PAINT AND APPLICATION THEREOF

(71) Applicant: Triad National Security, LLC, Los Alamos, NM (US)

(72) Inventors: Scott Avery Watson, Jemez Springs, NM (US); David Platts, Los Alamos, NM (US); Nicola Maree Winch, Los Alamos, NM (US); Steven Cool, Reading, MA (US)

(73) Assignee: Triad National Security, LLC, Los Alamos, NM (US)

( * ) Notice: Subject to any disclaimer, the term of this patent is extended or adjusted under 35 U.S.C. 154(b) by 472 days.

(21) Appl. No.: 16/544,808

(22) Filed: Aug. 19, 2019

Related U.S. Application Data (60) Provisional application No. 62/730,525, filed on Sep. 12, 2018.

(51) Int. Cl.

| | |
|---|---|
| *G01T 3/06* | (2006.01) |
| *H04N 5/225* | (2006.01) |
| *C09D 5/22* | (2006.01) |
| *C09D 5/24* | (2006.01) |
| *C09D 163/00* | (2006.01) |
| *G01T 1/202* | (2006.01) |
| *C09D 133/12* | (2006.01) |
| *C09D 175/04* | (2006.01) |
| *C09D 133/14* | (2006.01) |
| *C09K 11/77* | (2006.01) |
| *C09K 11/02* | (2006.01) |
| *C09D 129/14* | (2006.01) |

(52) U.S. Cl.
CPC .............. *G01T 3/06* (2013.01); *C09D 5/22* (2013.01); *C09D 5/24* (2013.01); *C09D 129/14* (2013.01); *C09D 133/12* (2013.01); *C09D 133/14* (2013.01); *C09D 163/00* (2013.01); *C09D 175/04* (2013.01); *C09K 11/02* (2013.01); *C09K 11/7733* (2013.01); *G01T 1/2023* (2013.01); *H04N 5/2256* (2013.01)

(58) Field of Classification Search
CPC ........... G01T 3/06; C09D 5/22; C09D 129/14
See application file for complete search history.

(56) References Cited

U.S. PATENT DOCUMENTS

| | | | | |
|---|---|---|---|---|
| 4,448,547 A | * | 5/1984 | Wickersheim | G01K 11/3213 250/461.1 |
| 2004/0159805 A1 | * | 8/2004 | Boutet | G01T 1/2014 250/586 |
| 2005/0035331 A1 | * | 2/2005 | Sun | C09J 7/29 252/301.5 |

(Continued)

OTHER PUBLICATIONS

"MiniMax: Miniature, Mobile, Agile, X-ray System", Los Alamos National Laboratory, 2013.

(Continued)

*Primary Examiner* — Hugh Maupin
(74) *Attorney, Agent, or Firm* — LeonardPatel PC; Sheetal S. Patel; Michael A. Leonard, II (57) ABSTRACT

A camera is used in conjunction with storage phosphor paint, configured to examine a surface. The surface is coated with storage phosphor paint in some embodiments. The camera is configured to image the surface coated with the storage phosphor paint, eliminating requirement of fast relaxation times associated with conventional scanners.

30 Claims, 7 Drawing Sheets

(56) References Cited

U.S. PATENT DOCUMENTS

2010/0283007 A1* 11/2010 Robinson ................ C09D 5/22
 252/301.36

OTHER PUBLICATIONS

Kersting, et al., "Influence of hydration and annealing on structure, PSL yield and spatial resolution of pressed powder imaging plates of the X-ray storage phosphor CsBrEu2+", Journal of Applied Physics 122, 084505 (2017).

* cited by examiner

RADIATION SENSITIVE PAINT AND APPLICATION THEREOF

CROSS-REFERENCE TO RELATED APPLICATION

This application claims the benefit of U.S. Provisional Patent Application No. 62/730,525 filed Sep. 12, 2018. The subject matter of this earlier filed application is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to phosphor paint, and more particularly, to radiation-sensitive storage phosphors.

BACKGROUND

There is a long-standing need for low-cost, room-temperature, large-area detectors for the identification and location of ionizing and/or non-ionizing radiation sources. One technique involves the use of storage phosphors that can be read out after the exposure, rather than during the exposure, to reduce or eliminate required equipment and to simplify system complexity and eliminate the need for a power source. For example, by integrating storage phosphors with a conventional and/or electroluminescent paint, the combination may produce a low-cost, room-temperature detector, of an arbitrary shape and size, to detect sources of ionizing and/or non-ionizing radiation.

SUMMARY

Certain embodiments of the present invention may provide solutions to the problems and needs in the art that have not yet been fully identified, appreciated, or solved by conventional radiation detector systems. For example, some embodiments pertain to the use of storage phosphors (optionally integrated with electroluminescent paint and filter dyes) as part of an ionizing and/or non-ionizing radiation detector system.

In an embodiment, a camera used in conjunction with storage phosphor paint is configured to examine a surface. The surface is coated with storage phosphor paint in some embodiments. The camera is configured to image the surface coated with the storage phosphor paint.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Existing storage phosphor scanners utilize planar geometries exclusively. However, with MiniMAX™'s (described in U.S. Pat. No. 9,588,234 B2) unique ability to scan non-planar geometries, the ability to further utilize "painted", and in some embodiments, non-planar surfaces may be achieved. As a result, numerous paint formulations have been developed, as described in the embodiments below, to enable that combination.

Furthermore, existing radiation detectors require the use of phosphors that have "fast" (order 1 microsecond) relaxation times to enable reasonable scan rates. By utilizing MiniMAX™'s unique flash scan technique, the requirement for fast relaxation times is eliminated, thereby enabling the use of many additional chemical formulations previously rejected as unsuitable (e.g., chemical formulations such as $CsBr:Ga^+$, $RbBr:Ga^+$, $Lu_2O_3$), as well as commercially available storage phosphors (e.g., $CsBr:Eu^{2+}$ and $BaFX:Eu^{2+}$ where X=Cl, Br, I).

Some embodiments generally pertain to using storage phosphor paints in conjunction with MiniMAX™. For example, one configuration allows for detection of radioactive materials in shipping containers, another application is "invisible ink", etc.

Storage Phosphor Paints

In some embodiments, storage phosphor paints may be composed of storage phosphor particles and organic (plastic) binders. These paints may be applied onto any surface. For example, paints may be applied onto a planar surface or non-planar surface, either surface having any texture or condition. A planar surface may be defined as a flat surface, and a non-planar surface may be defined as curved or irregular surface.

When the storage phosphor paints are combined with the MiniMAX™ camera system, for example, numerous uses may arise. A more detailed explanation of the use and approach of the storage phosphor paints are discussed below.

Approaches for Storage Phosphor Paints

Figure 1:
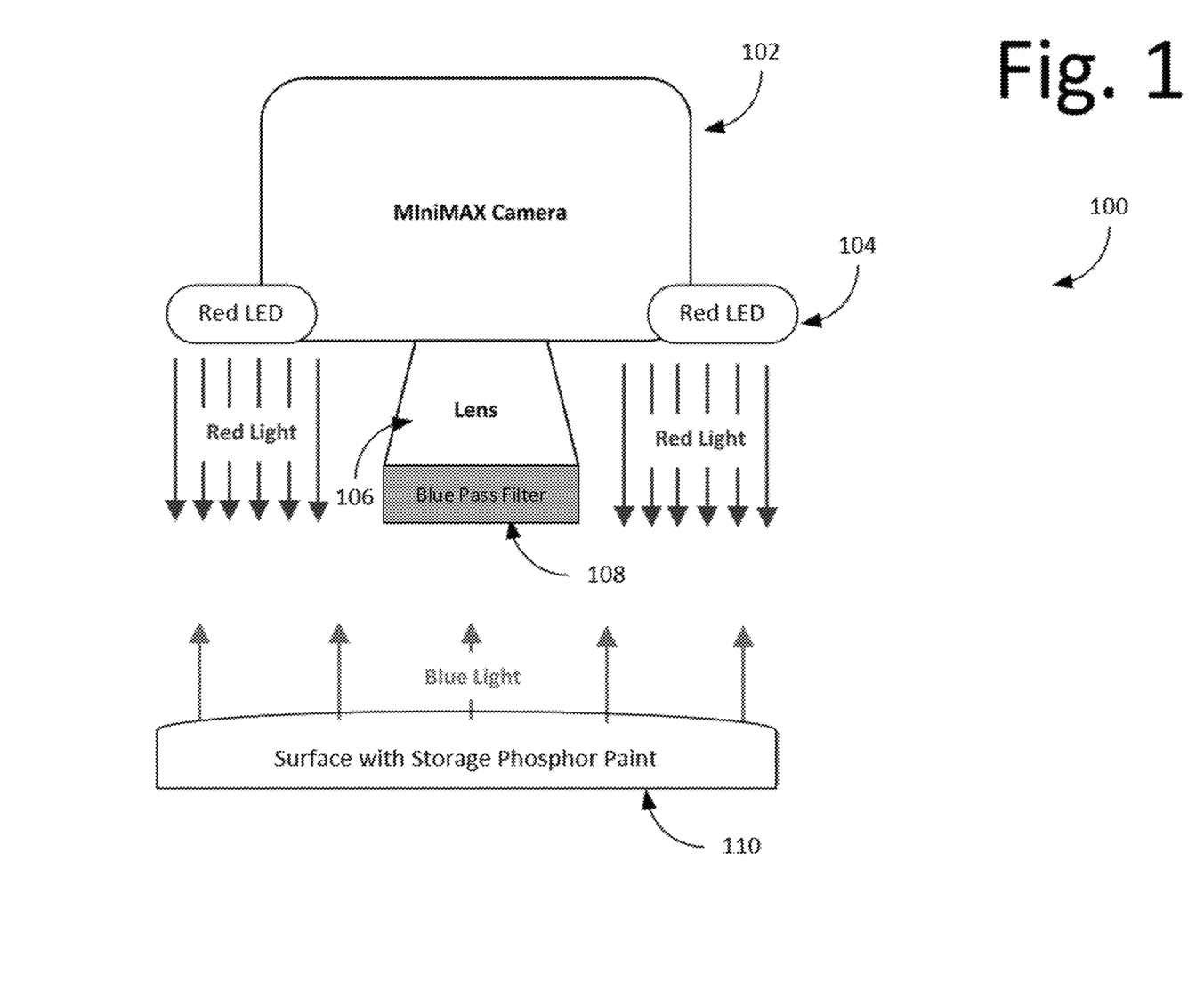
FIG. 1 is a diagram illustrating a paint layer approach, according to an embodiment of the present invention.

It should be appreciated that there may be a variety of approaches to use radiation-sensitive, storage phosphor paints. FIG. 1 illustrates a paint layer approach 100 using a potentially non-planar surface with storage phosphor paint 110, according to an embodiment of the present invention. Although not illustrated in FIG. 1, one skilled in the art would appreciate that paint layer approach 100 may also be used on a planar surface or an irregular surface.

In some embodiments, MiniMAX™ camera system 102 includes: a bright red light emitting diode (LED) flashbulb 104, a lens 106, and a dichroic, blue filter 108 attached thereto. Although MiniMAX™ camera system 102 uses one or more LEDs for the purposes of explaining the embodiments described herein, other embodiments may include other sources of light, e.g., bright red light of required wavelength. For example, alternative embodiments may include cathodoluminescence as a source to emit at almost any wavelength, from red to ultraviolet (UV). Red LED flashbulb 104, for example, may emit red light in the direction of the surface with storage phosphor paint 110. The surface with storage phosphor paint 110 being situated opposite to that of MiniMAX™ camera system 102 will emit a blue photo-stimulated light in response to the red excitation light.

More specifically, with the storage phosphor particles embedded in the storage phosphor paint 110, ionizing radiation is absorbed in the storage phosphor particles creating electrons and holes (not shown). These electrons and holes are trapped in the crystal lattice of the storage phosphor particles at defects or impurities. These trapped electrons and holes, which in number are directly proportional to the absorbed radiation dose, can exist in a persistent, metastable, quantum state. The image is read out (formed) by subjecting storage phosphor paint/particles 110 to high-intensity, red excitation light (e.g., commonly 633 nm). This red light causes the electrons to be released from their trapped state and to recombine with nearby holes. The recombination energy is transferred to an activator ion (for example $Eu^{2+}$), which then emits characteristic photo-stimulated, short-wavelength (e.g., blue) light itself in proportion to the absorbed ionizing radiation dose.

Although a blue light is emitted in this embodiment, in other embodiments, a different emission wavelength, such as a green light, may be emitted in response to the excitation light from MiniMAX™ camera 102 and red LED 104. The wavelength of emitted light is a function of specific dopants in the storage phosphor.

In this embodiment, paint layer approach 100 may be used for an application like painting the inside of a standard shipping container. The configuration has the following advantages: the storage phosphor paint is nearly identical to ordinary paints in terms of application, robustness, protective qualities, etc.; it requires no electrical power to function; and it can persist in a metastable state for weeks or months without significant loss of the image formed (provided a dark environment (e.g., the inside of a shipping container) exists.)

Figure 2:
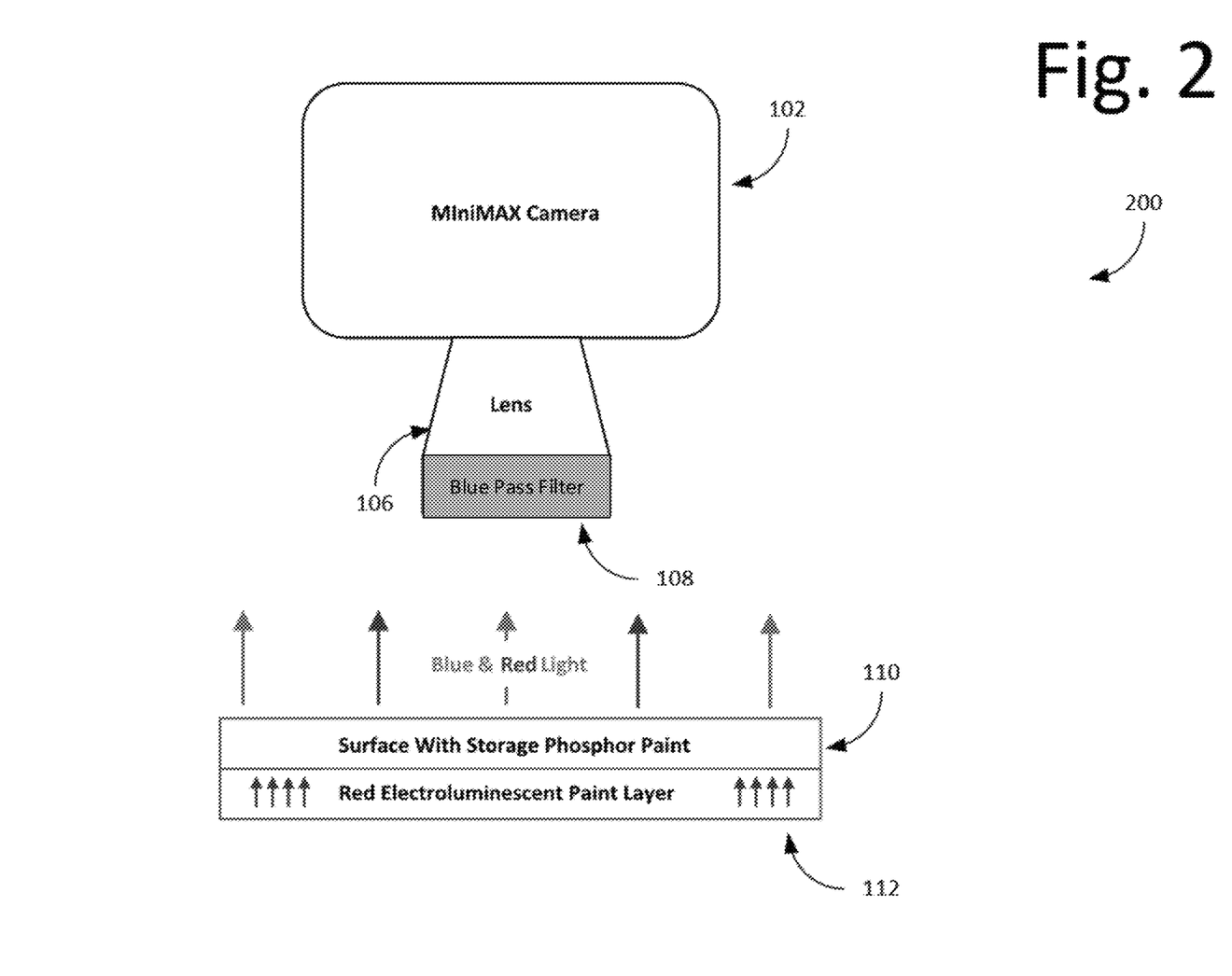
FIG. 2 is a diagram illustrating a backlight approach, according to an embodiment of the present invention.

FIG. 2 is a diagram illustrating a backlight approach 200 using a surface with storage phosphor paint 110, according to an embodiment of the present invention. In this embodiment, MiniMAX™ camera 102 includes a blue filter 108 attached to lens 106 without the use of a red flash. Instead, this embodiment uses a surface with storage phosphor paint 110 backlit with a "red", electroluminescent paint 112. By backlighting storage phosphor paint 110 with electroluminescent paint 112, camera 102 does not need a red LED flashbulb and only requires a filter 108 to take images. Because the storage phosphor paint layer attenuates the red light rather than reflecting the red light, this embodiment may also reduce the amount of red light incident on camera 102.

Simply stated, a red light source is supplied as a backlight in this embodiment, which causes [some to most of the] red light to enter storage phosphor paint 110. By red light entering storage phosphor paint 110, some of the red light is converted to blue light, which is imaged by camera 102, some of the red light transits storage phosphor paint 110 and reaches camera 102, and the remaining red light is absorbed by or leaves storage phosphor paint 110 without effect. Further, storage phosphor paint 110 attenuates the red light and converts the red light during photostimulation. This conversion causes less red light to reach camera 102 to blur the blue-light image than if the red light were provided in front of storage phosphor paint 110.

It should be noted that the red light is used to photostimulate storage phosphor paint 110 to emit another wavelength (e.g., blue) of light. For example, the red light may blur (or wash out) the desired blue-light image. To increase the ratio of blue light to red light reaching the camera 102, the red light is supplied as a backlight to storage phosphor paint 110, instead of front-illuminating storage phosphor paint 110 with the red light. This positioning of the red light allows for storage phosphor paint 110 to reduce the amount of red light that reaches camera 102.

In some further embodiments, a more sophisticated, multi-layer paint coating may be required. For example, additional layers of paint may serve the same purposes as filters in the original MiniMAX™ camera system. In some embodiments, filter paint may be layered on top of storage phosphor paint. By increasing the complexity of the painted layers, the complexity of the camera is often correspondingly reduced. Depending upon the specifics of the application, the camera may be as simple as an ordinary digital "SLR" type camera commonly sold for professional photography (e.g., Sony Alpha™, Leica Monochrom™, Nikon D8000™).

This embodiment may be used on in-situ weld or component inspection such as crack inspection along an aircraft wing. A modification of this approach may include moving blue filter 108 from MiniMAX™ camera 102 to the top of the surface with storage phosphor paint 110 when no other light source exists.

Figure 3:
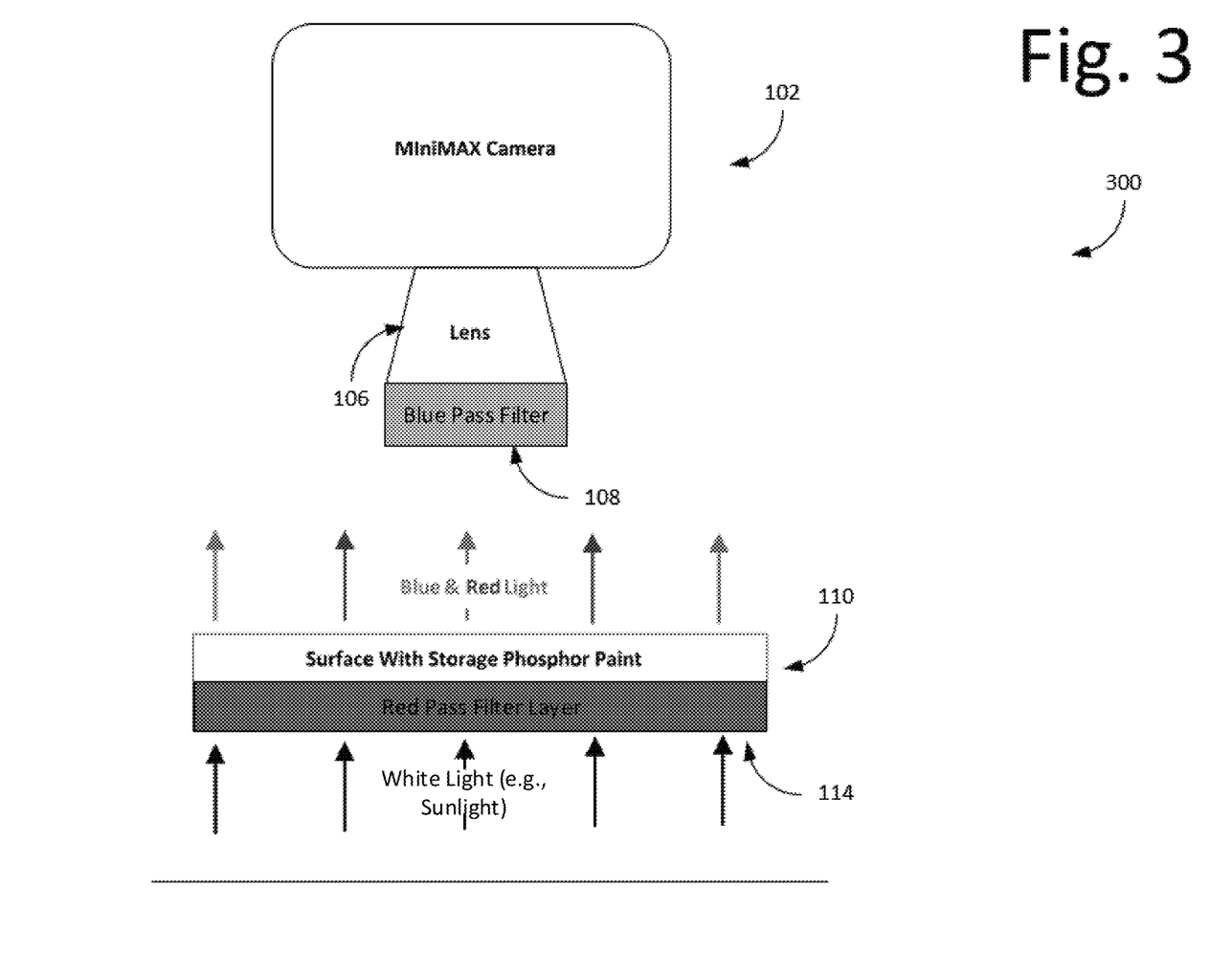
FIG. 3 is a diagram illustrating a sunlight or room light approach, according to an embodiment of the present invention.

FIG. 3 illustrates a sunlit approach 300 using a surface with storage phosphor paint 110, according to an embodiment of the present invention. Like the other embodiments, MiniMAX™ camera 102 includes a lens 106 and a blue filter 108. However, in this embodiment, ordinary, white light, such as sunlight, is used to backlight the surface with storage phosphor paint 110 by way of a high-efficiency red filter (e.g., dye filter) layer 114. This embodiment may utilize ordinary ambient light instead of a bright, LED flash. Such an embodiment might be useful in invisible ink or user authentication applications.

As shown in FIG. 3, by placing red filter layer 114 behind the surface with storage phosphor paint 110, only the "red" component of the light passes onto the storage phosphor surface and onto the camera lens. This may allow creation and detection of invisible ink in some embodiments.

Figure 4:
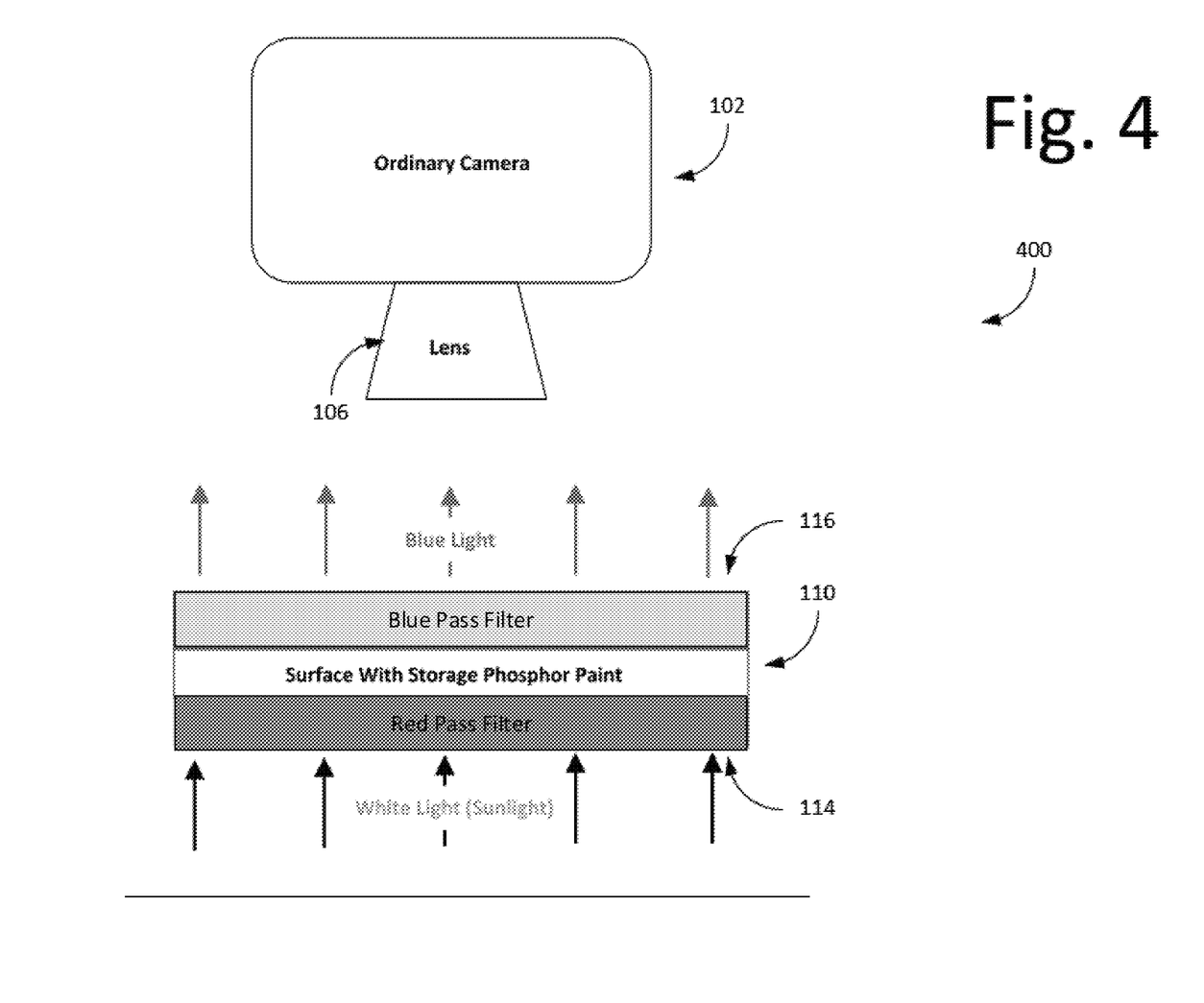
FIG. 4 is a diagram illustrating the use of an ordinary consumer camera, according to an embodiment of the present invention.

FIG. 4 illustrates a camera approach 400 using a surface with storage phosphor paint 110, according to an embodiment of the present invention. Unlike the other embodiments, this embodiment uses an ordinary camera 102 with a lens 106. Opposite to ordinary camera 102 is a surface with storage phosphor paint 110. The surface with storage phosphor paint 110 is sandwiched between blue pass filter layer 116 and red pass filter layer 114. By sandwiching the surface with storage phosphor paint 110 between red pass filter 114 and a blue pass filter 116, an ordinary camera 102 may operate without any attachments provided that a "dark" environment exists between camera lens 106 and the paint layers. Further, in this embodiment, white light passes through red pass filter layer 114 and onto the surface with storage phosphor paint 110. In turn, by placing blue pass filter layer 116 in front of the surface with storage phosphor paint 110, the white light passing through the storage phosphor is transformed via the photostimulation process into blue light, which is then incident upon camera lens 106.

It should be appreciated that the complexity is shifted from ordinary camera 102 to the surface of storage phosphor paint 110. In essence, this embodiment pertains to a two-component film using ordinary sunlight and an ordinary camera. Although this embodiment may be less efficient, with lower quality than the other approaches, this embodiment integrates the system complexity into the "paint" layer, making it attractive to the consumers who already own cameras and optics.

Although FIGS. 2-4 illustrate planar surfaces 110, one would readily appreciate non-planar surfaces, such as that shown in FIG. 1, may also be used. In other words, the surface with the storage phosphor paint(s) may be curved, flat, or non-planar in a regular or irregular fashion/pattern.

Storage Phosphor Paint

The storage phosphor paint is created by mixing the storage phosphor powder of choice with a binder material/paint base. Typical paint bases tested include, but are not limited to, two-part epoxy, polyvinyl butyral, polymethyl methacrylate, polyurethane and ethyl cyanoacrylate.

It should be appreciated that storage phosphor paints, comprising solvent-based binders plus storage phosphor and other materials, such as thinners (to adjust viscosity) and proprietary conditioning agents (to improve certain characteristics of the SPP, such as to prevent/reduce yellowing, inhibit chemical reactions, inhibit visible light effects) were initially tested. The "solvent-based binders" may include any suitably clear (when cured) material from various paint families, including lacquers and polyurethanes.

Storage Phosphor Paint Creation Example

In an embodiment, CsBr powder is dissolved in water to produce saturated, aqueous CsBr. The CsBr solution is sprayed as a fine mist into ethanol. The reduced solubility of CsBr in water (~1 kg/l) to ethanol (1 g/l) causes the CsBr powder to precipitate and create a fine powder. The excess ethanol/water solution is removed and discarded. $EuBr_2$ dopant required to make 0.2 mol %, is dissolved into the CsBr slurry.

The slurry was dried in air in a two-step process, first at 50° C. until the remaining liquid has evaporated, and then at 120° C. to thoroughly dry the powder. After drying, the powder is a yellow to white color.

To address oxidation, in some embodiments, materials are stored in a sealed container with an oxygen scavenger (oxygen absorber) and are used in an oxygen-scavenged container ("dry box"). Similarly, desiccants and/or other materials (e.g., saturated salt solutions comprising salts such as lithium chloride, sodium chloride, or potassium sulphate) may also or instead be used in such a container to reduce or otherwise control the ambient humidity level. Oxygen scavenging and/or such humidity control may be beneficially utilized with any mixture of any ingredients (e.g., binder, storage phosphor, additive), since one or more ingredients, or a particular mix of ingredients, may be adversely affected by certain ambient levels of oxygen and/or humidity, or may require certain oxygen and/or humidity levels to achieve optimal states or performance.

To improve the photostimulated light output of the powder, hydration and annealing steps are performed. The powder is hydrated at 75% relative-humidity for 1 hour followed by annealing at 220° C. for two hours in air, followed by hydration for 10 minutes at 75% relative humidity.

Storage phosphor powder ($CsBr:Eu^{2+}$ sieved to a grain size of less than 50 microns) is then added to two-part epoxy, thus creating a paint. The paint is then spread onto a substrate (e.g., tungsten) and left to dry at room temperature (~25° C.) in atmosphere. This paint has a photostimulated luminescence (PSL) comparable to commercial BaFBr imaging plates.

Producing the $CsBr:Eu^{2+}$ storage phosphor powder in air may be sub-optimal. The properties may be improved by production in an inert atmosphere such as nitrogen or argon, and by the control of humidity in the inert atmosphere.

Two or more storage phosphors with different emission characteristics (primarily different emitted light wavelengths) may be used, e.g., in layers (a phoswich (phosphor sandwich) sensor) rather than mixed.

When used in separate layers, the multiple different phosphors inherently provide depth-of-interaction information, from which radiation type (e.g., alpha vs. gamma/X-ray), radiation energy range information, and in conjunction with a coded aperture or other patterned attenuator, enhanced directional and spatial location information, may be inferred.

In one example, a thin storage phosphor paint surface layer detects alphas; the next layer primarily detects lower-energy gammas/X-rays; and the next deeper layer primarily detects higher energy gammas/X-rays (e.g., "lower" and "higher" being relative). In conjunction with a coded aperture or other patterned attenuator, the deeper the interaction, the more precise the estimate of the direction from which the radiation originated, and the location of the emitter(s) of the radiation, A layer of binder material without storage phosphor may separate the phosphor-containing storage phosphor paint layers. This further enhances the directionality inferred by the depth of interaction of the radiation interactions when a coded aperture or other patterned attenuator is used. By using the same binder as used in the storage phosphor paint, the refractive indexes are matched to reduce the effect of separate layers on light traversing the layers.

In conjunction with a coded aperture or other patterned attenuator, the layer in which an event is detected enhances the directional information for the source, improving the accuracy of the location estimation.

With or without a coded aperture or other patterned attenuator, the depth of interaction suggests an energy range for the event.

Figure 5:
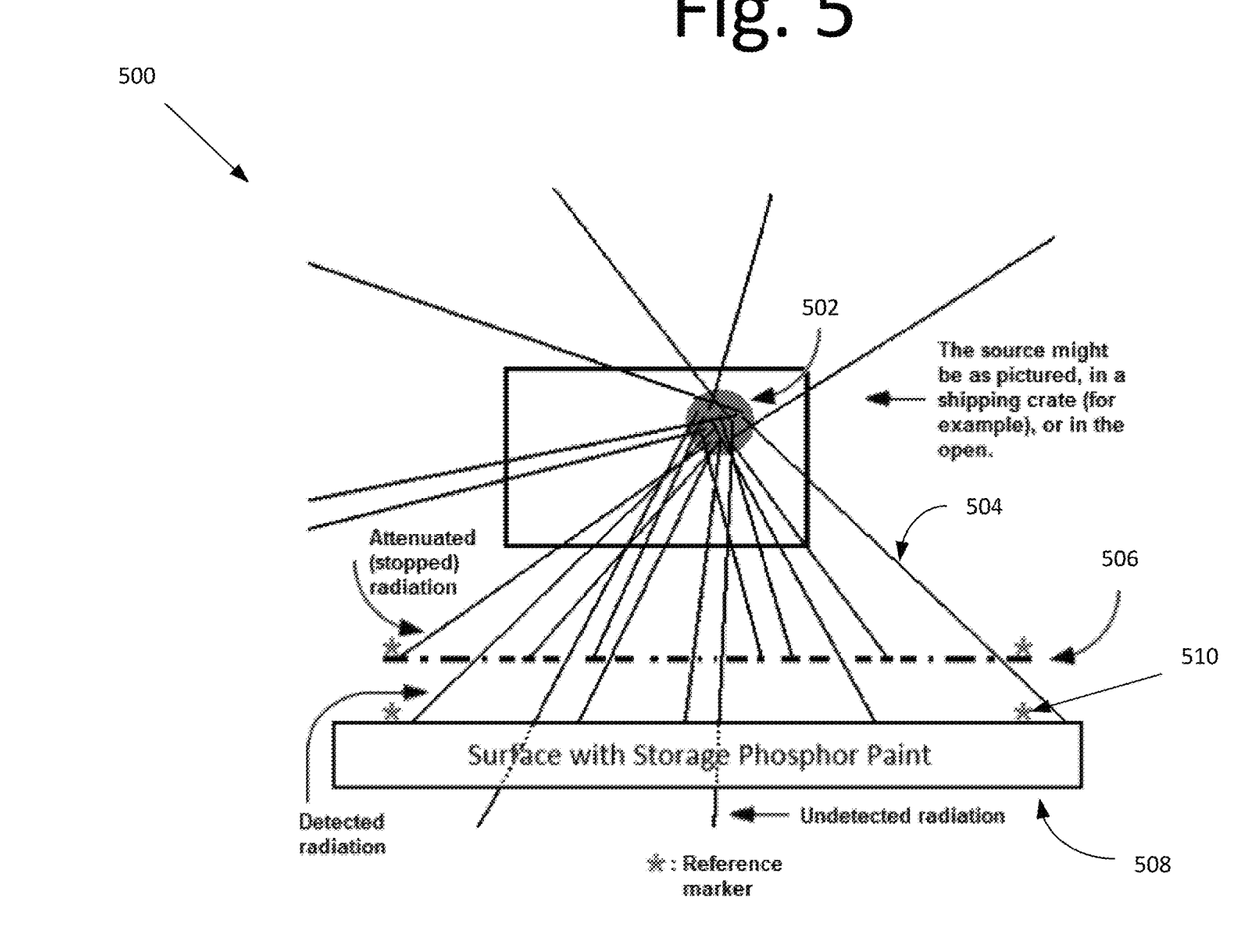
FIG. 5 is a diagram illustrating a radiation detection system incorporating a coded aperture.

FIG. 5 is a diagram illustrating a radiation detection system 500, according to an embodiment of the present invention. In this embodiment, an ionizing and/or non-ionizing radiation source 502 emits radiation 504 in any and all directions. Radiation source 502 may be inside of a shipping crate, for example, or in the open, depending on the circumstances. It should be also noted that in some circumstances, a number of radiation sources may exist.

A coded aperture attenuator 506 is placed between radiation source 502 and the surface with storage phosphor paint 508. Coded aperture attenuator 506 is configured to allow approximation of the volume, spatial location, distance from the detector, and activity of radiation source 502. In some embodiments, to image the surface with a camera, coded aperture attenuator 506 may be placed further away (e.g., out of the way) from the front of the surface of the storage phosphor paint 508.

Figure 6:
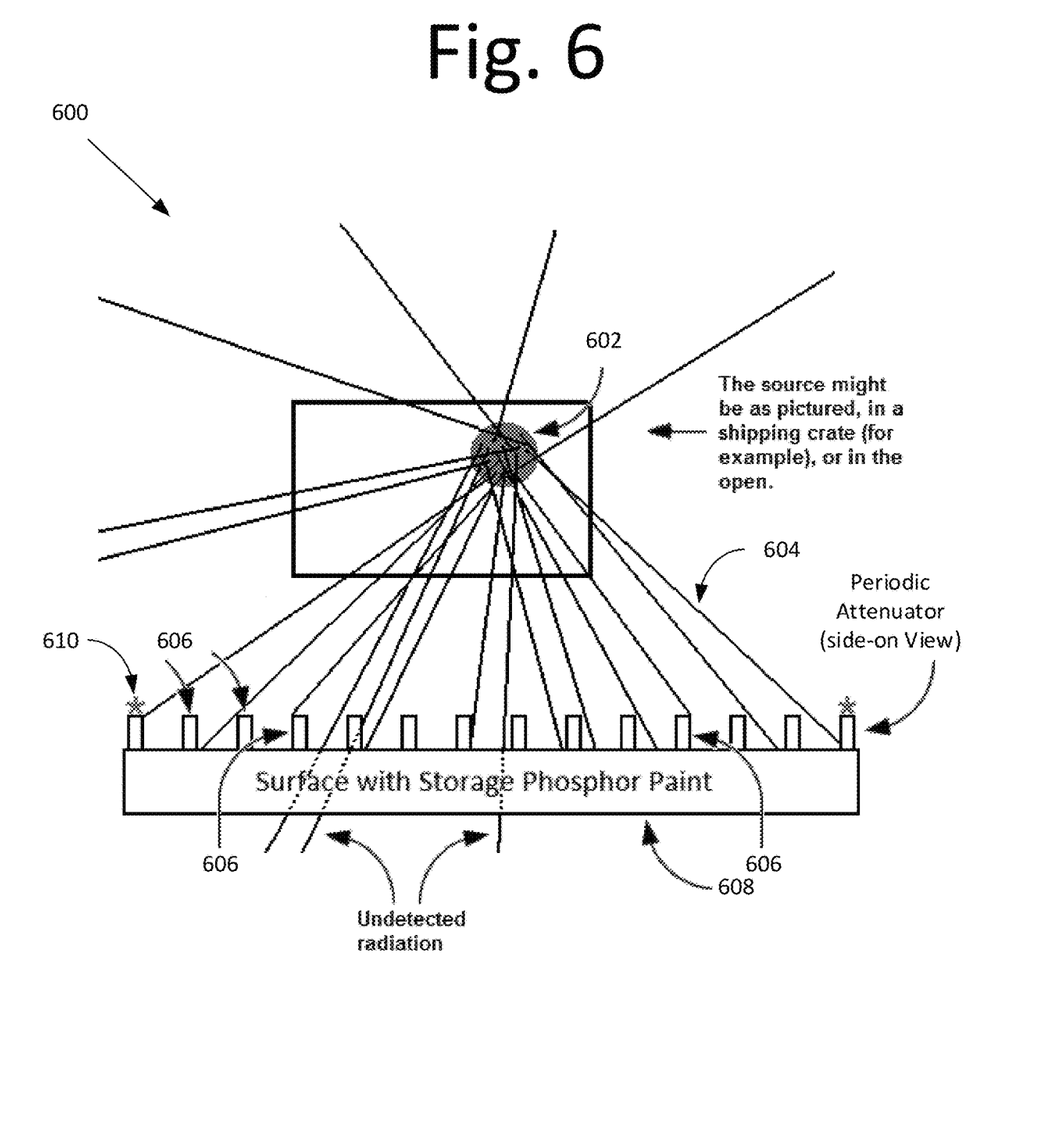
FIG. 6 is a diagram illustrating a radiation detection system incorporating a patterned attenuator, according to an embodiment of the present invention.

FIG. 6 is a diagram illustrating a radiation detection system 600, according to an embodiment of the present invention. Similar to FIG. 6, a radiation source 602 emits radiation 604 in any and all directions. Coating the side surfaces of the protrusions/vanes/slats 606 that are perpendicular to, or in any case not co-planar with the painted surface, provides additional sensitivity to that of the planar surface. Sensitivity may be characterized, in part, as the area of storage phosphor paint exposed to the source(s) of radiation, the likelihood that radiation will be stopped by the storage phosphor paint, and the likelihood that a charge will be deposited in the storage phosphor, to be detected (read out) subsequently.

In some embodiments, the tops of protrusions/vanes/slats 606 that are co-planar, or nearly co-planar, with the planar surface are not coated with storage phosphor paint. In those embodiments, determination of directionality is enhanced. It should be noted that in this figure, some radiation is detected by the painted surface of storage phosphor paint 608, some is detected by the side walls of the protrusions/vanes/slats 606, some is simply stopped by the tops, and some is entirely missed.

For both FIGS. 5 and 6, the attenuator, usually planar but also possibly curved or conforming to some other topology of the storage phosphor paint-painted surface is interposed between the possible location(s) of sources of radiation and the storage phosphor paint-painted surface. Reference points and shapes (e.g., objects) ("reference markers") 510 and 610, which the camera can image simultaneously with the storage phosphor paint-painted surface(s), may be mounted or applied on or near the storage phosphor painted surface(s) at known positions (e.g., with respect to coded aperture or periodic attenuators) to provide spatial references. These spatial references may allow correction (morphing) of acquired images for an off-perpendicular-central-axis viewing angle of the camera to provide references for the position of a coded aperture in front of the storage phosphor paint-painted surface, and to provide references for periodic attenuators in front of the storage phosphor paint-painted surface, or when the storage phosphor paint-painted surface is non-planar. These spatial references may also aid in correcting for more complex distortion in images (e.g., barrel distortion when photographing in close quarters, such as in a storage container, with a wide angle lens or photographing with a zoom lens) later (e.g., using Adobe Photoshop™ or Adobe Lightroom™ software), again allowing determination of more accurate spatial and activity information for the source(s) of radiation.

Figure 7:
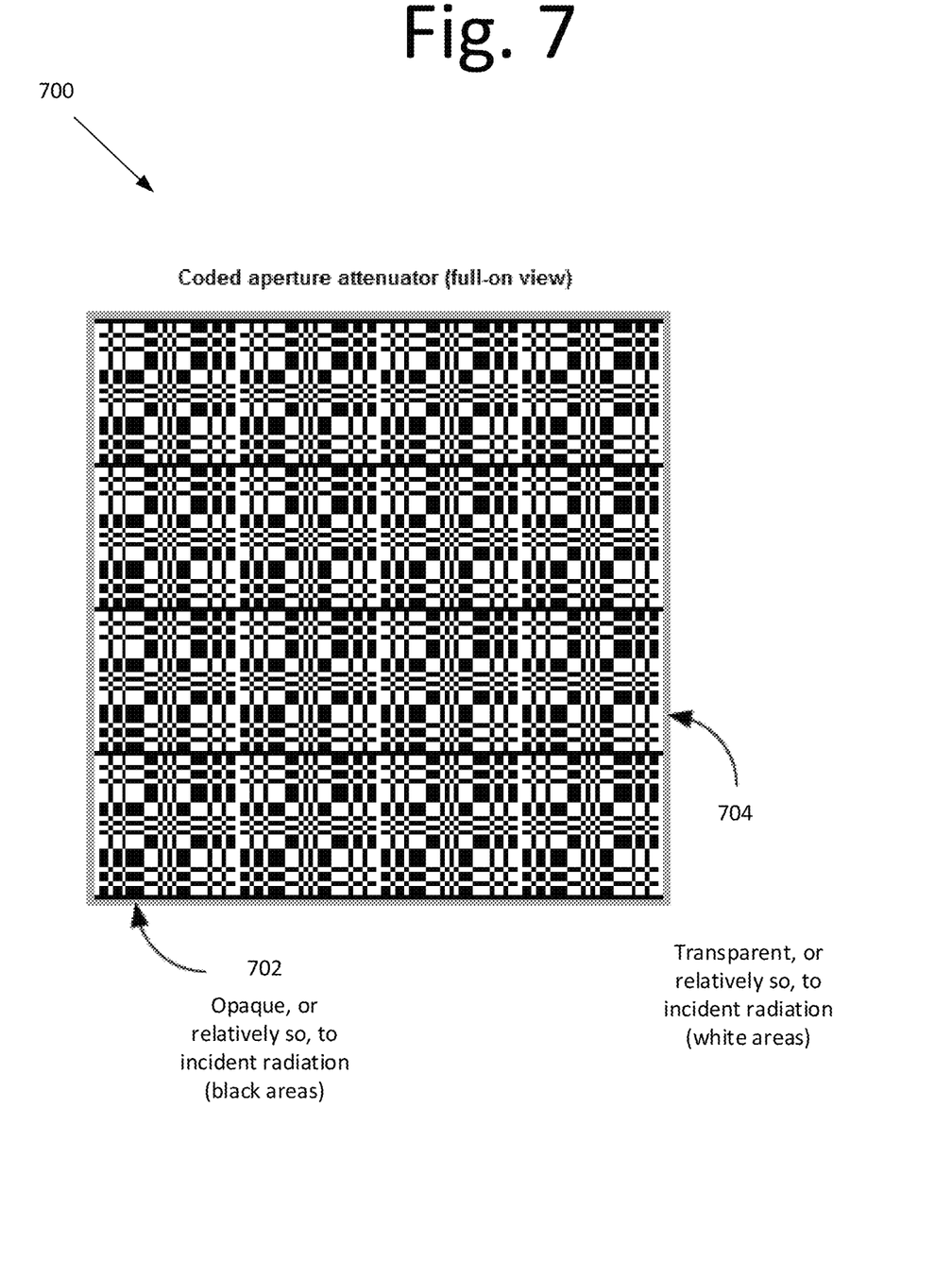
FIG. 7 is a diagram illustrating a coded-aperture attenuator, according to an embodiment of the present invention.

FIG. 7 is a diagram illustrating a coded aperture attenuator, according to an embodiment of the present invention. It should be appreciated that coded aperture attenuator 700 is just one of a multitude of possible designs (patterns). For instance, in an embodiment, black areas 702 represent attenuating and, in some cases, other non- or less-attenuating material for the anticipated radiation. White areas 704, for example, represent openings in the coded aperture structure, or material that will not attenuate or will attenuate less of the anticipated radiation than the materials of black areas 702.

In an embodiment, a camera used in conjunction with storage phosphor paint is configured to examine a surface. The surface is coated with storage phosphor paint in some embodiments. The camera is configured to scan the surface coated with the storage phosphor paint, eliminating the requirement of fast relaxation times.

In another embodiment, the storage phosphor paint is coated onto a non-planar surface.

In yet another embodiment, the storage phosphor paint is coated onto a planar surface.

In yet a further embodiment, the camera includes a bright LED flash configured to emit red light in a direction of the surface coated with the storage phosphor paint.

In some embodiments, the surface coated with the storage phosphor paint is opposite to that of the camera, configured to emit a blue photo-stimulated light responsive to the red excitation light.

In some further embodiments, a red electroluminescent paint backlights the storage phosphor paint to reduce red light incident on the camera.

In some other embodiments, a blue pass filter is placed in front of the surface coated with the storage phosphor paint, when light sources are nonexistent on the camera.

In certain embodiments, white light backlights the surface with the storage phosphor paint by way of a red pass filter layer. The placement of the red pass filter behind the surface with the storage phosphor paint causes red light to pass onto the surface with the storage phosphor paint and onto a lens of the camera.

In some additional embodiments, the storage phosphor paint is sandwiched between a blue pass filter layer and a red pass filter layer. The red pass filter layer is configured to pass the red component of white light onto the surface with the storage phosphor paint. The red light passing through the surface with the storage phosphor paint is transformed via a photostimulation process into blue light, the blue light is then incident upon a lens of the camera.

One or more embodiments allow for the detection of sources of neutron emission (neutron emitters). Neutrons are effectively non-ionizing, but are detectable by storage phosphors by using any one or more of various converter materials (being or containing, for example, the elements boron, dysprosium and/or gadolinium) in conjunction with the storage phosphors, in order to in order to convert the incident non-ionizing neutron radiation into ionizing radiation, which ionizing radiation is then detected by the storage phosphors. "In conjunction with", just above, includes any of various approaches, including the converter being combined with the storage phosphor paint (e.g., converter material powder mixed into the storage phosphor paint), the converter being a separate coating (e.g., converter material painted onto the surface), or converter material being a foil or sheet conforming to the storage phosphor paint-painted surface.

In some embodiments, a patterned attenuator is interposed between a radiation source and the storage phosphor coating to provide an indication of directionality for the radiation. In an embodiment, the material comprising the attenuator is selected, in part, according to the type of radiation to be detected, ionizing and/or non-ionizing (e.g., lead attenuates X-rays and gamma rays highly effectively, but is nearly transparent to neutrons, while polyethylene and/or boron attenuates neutrons highly effectively). In a further embodiment, for a patterned attenuator, such as a coded aperture made of or coated with a converter and/or absorber material such as boron (e.g., natural boron or 10B-enriched boron), used in neutron detection or shielding, and positioned close to a storage phosphor surface (e.g., within 7 to 10 cm), a layer of lead, which thickness is determined according to the expected energies of the incident ionizing radiation and the ionizing radiation produced by the converter and/or absorber material, may be applied to the side of the coded aperture facing the storage phosphor. This allows for the capture of (n,alpha)-reaction products from neutron-boron interaction, and attenuates some or most parts of other stray ionizing radiation arriving at the face of the coded aperture.

In some embodiments, the surface(s) coated with storage phosphor paint is (are) enclosed within, covered with, or shaded by an opaque material, such as thin black plastic, to prevent or minimize exposure to stray light. The opaque material may be removed, for example in the dark or in red light prior to using the MiniMAX™ camera. This opaque material minimally attenuates ionizing and/or non-ionizing (neutron) radiation.

In certain embodiments, the patterned attenuator is a coded aperture structure (such as a "modified uniformly redundant array", MURA), positioned in front of the storage phosphor paint (good for planar surfaces), or a periodic attenuator in one dimension (e.g., slats placed in front of the storage phosphor paint) or two dimensions (e.g., crosshatch slats, or honeycomb structure, or egg crate-shaped).

In yet some further embodiments, the attenuator itself may be coated selectively with storage phosphor paint. This way, depending upon the angle of the source of radiation with respect to the attenuator, one or more portions of the storage phosphor paint are exposed directly to the radiation while other portions are not, and when read out, the amount and position of exposure allows the direction of the radiation source, and possibly its location and activity, to be determined or inferred.

In one or more embodiments, imaging the storage phosphor paint-coated surface from more than one position (e.g., horizontal and/or vertical angle), especially in the case of a periodic attenuator, aids in the determination of direction, location and activity of the radiation source.

In some embodiments, a surface may be imaged with multiple camera exposures, each from a different position, where the amount of photostimulation light for each exposure is adjusted in wavelength distribution, intensity and/or duration to allow multiple exposures and to balance the excitation response (light emission) of the storage phosphor for each.

Also, in some embodiments, the patterned attenuator (e.g., slats) is configured to provide protection against stray visible light reaching the storage phosphor paint.

In an embodiment, a shield selectively and substantially reduces the amount of initial ionizing or non-ionizing radiation reaching the storage phosphor paint, while minimally attenuating neutrons. For example, the shield, which includes lead, reduces the amount of the initially emitted ionizing radiation reaching the storage phosphor paint. In another example, the shield, which includes polyethylene or boron, reduces the amount of neutron radiation reaching converter materials in or near the storage phosphor paint, while minimally attenuating X-rays and gamma rays.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a camera used in conjunction with storage phosphor paint, the storage phosphor paint comprising storage phosphor particles configured to absorb ionizing radiation that creates electrons and holes in a crystal lattice of the storage phosphor particles, wherein
the camera is configured to examine a surface coated with the storage phosphor paint.

2. The apparatus of claim 1, wherein the storage phosphor paint is coated onto a non-planar surface.

3. The apparatus of claim 1, wherein the storage phosphor paint is coated onto a planar surface.

4. The apparatus of claim 1, wherein the camera comprises
a bright light emitting diode (LED) flashbulb or another source of red light configured to emit red light in a direction of the surface coated with the storage phosphor paint.

5. The apparatus of claim 4, wherein the surface coated with the storage phosphor paint is opposite to that of the camera, configured to emit a blue photo-stimulated light responsive to the red excitation light.

6. The apparatus of claim 1, further comprising:
a red electroluminescent paint backlights the storage phosphor paint to reduce red light incident on the camera.

7. The apparatus of claim 1, further comprising:
a red light source is supplied as a backlight, causing red light to photostimulate the storage phosphor paint, thereby producing blue light,
wherein a portion of the blue light is emitted in a direction of the camera, while the storage phosphor paint attenuates or scatters a portion of the red light that has not caused photostimulation, thereby causing less red light to reach the camera to blur a blue-light image.

8. The apparatus of claim 1, further comprising:
a blue pass filter placed in front of the surface coated with the storage phosphor paint, when light sources are nonexistent on the camera and the storage phosphor paint is backlighted.

9. The apparatus of claim 1, further comprising:
a white light backlights the surface with the storage phosphor paint by way of a red pass filter layer, wherein
placement of the red pass filter layer behind the surface with the storage phosphor paint allows red light to pass onto the surface with the storage phosphor paint and thence blue light onto a lens of the camera.

10. The apparatus of claim 1, wherein the storage phosphor paint is sandwiched between a blue pass filter layer and a red pass filter layer,
the red pass filter layer is configured to pass red light onto the surface with the storage phosphor paint,
a photostimulation process transforms the red light passing through the surface with the storage phosphor paint into a blue light, causing the blue light to be incident upon a lens of the camera.

11. An apparatus, comprising:
a patterned attenuator interposed between an ionizing radiation source, a non-ionizing radiation source, or both, and a layer of storage phosphor paint, the patterned attenuator provides an indication of directionality and location for emitted radiation and allows for estimation of emitted radiation activity, wherein
the ionizing radiation source, non-ionizing radiation source, or both, emits the radiation in a plurality of directions.

12. The apparatus of claim 11, wherein the patterned attenuator is a coded aperture structure, positioned in front of the layer of storage phosphor paint, or a periodic attenuator in one dimension or two dimensions.

13. The apparatus of claim 12, wherein the periodic attenuator in one dimension is comprised of slats placed in front of the layer of storage phosphor paint.

14. The apparatus of claim 12, wherein the periodic attenuator in two dimensions is crosshatch slats, a honeycomb structure, or egg crate-shaped.

15. The apparatus of claim 11, wherein the patterned attenuator is coated selectively with the layer of storage phosphor paint, and
depending upon the angle of the ionizing radiation source, the non-ionizing radiation source, or both, with respect to the patterned attenuator, one or more portions of the storage phosphor paint are exposed directly to the emitted radiation while other portions are not, and when read out, the amount and position of exposure allows the direction, location and activity of the ionizing radiation source, the non-ionizing radiation source, or both to be determined or estimated.

16. The apparatus of claim 11, wherein the patterned attenuator is further configured to provide protection against stray visible light reaching the layer of storage phosphor paint.

17. The apparatus of claim 16, wherein a surface coated with the layer of the storage phosphor paint is enclosed within, cover with, or shaded by, an opaque material to prevent or minimize exposure to stray light.

18. The apparatus of claim 11, further comprising:
one or more cameras configured to image the storage phosphor paint-coated surface from more than one position to aid in the determination of direction and location, and the estimation of activity of the ionizing radiation source, the non-ionizing radiation source, or both.

19. The apparatus of claim 18, wherein the one or more cameras are located at different positions such that an amount of photostimulation light for each exposure is adjusted in wavelength distribution, intensity and/or duration to allow multiple exposures and to balance the excitation response of the storage phosphor for each.

20. The apparatus of claim 11, further comprising:
a shield configured to selectively reduce an amount of initial ionizing or non-ionizing radiation reaching the layer of storage phosphor paint, wherein
the shield comprising lead, another attenuating material, or both, reduces the amount of the initially emitted ionizing radiation reaching the layer of storage phosphor paint, or
the shield comprising polyethylene, boron, another attenuating material, or any combination thereof, reduces the amount of neutron radiation reaching converter materials in or near the layer of storage phosphor paint.

21. A process for manufacturing or creating a storage phosphor paint, the process comprising:
mixing a storage phosphor powder configured to absorb ionizing radiation with a paint base, the paint base comprising a two-part epoxy, polyvinyl butyral, polymethyl methacrylate, polyurethane, and/or ethyl cyanoacrylate, to create the storage phosphor paint, wherein
the storage phosphor paint further comprises one or more solvent-based binders and pre-selected materials.

22. The process of claim 21, wherein the pre-selected materials comprises one or more thinners to adjust viscosity.

23. The process of claim 21, wherein the pre-selected materials comprises one or more conditioning agents to prevent or reduce yellowing, inhibit chemical reactions, and inhibit visible light effects.

24. The process of claim 21, wherein the one or more solvent-based binders comprises material from one or more paint families, the one or more paint families comprising lacquers and polyurethanes.

25. The process of claim 21, wherein the storage phosphor powder that is configured to absorb ionizing radiation is created by:
dissolving CsBr powder in water to produce saturated, aqueous CsBr solution, wherein the CsBr solution is sprayed as a fine mist into ethanol, causing the CsBr powder to precipitate and create a fine powder; and
removing excess ethanol and water from the CsBr solution to create a CsBr slurry.

26. The process of claim 25, wherein a $EuBr_2$ dopant is dissolved into the CsBr slurry.

27. The process of claim 25, further comprising:
drying the CsBr slurry in air in a two-step process, wherein the drying of the CsBr slurry comprises
drying the CsBr slurry at 50° C. until the liquid has evaporated from the CsBr slurry, and
drying the CsBr slurry at 120° C. to thoroughly dry the powder.

28. The process of claim 27, further comprising:
performing hydration and annealing steps to improve photo stimulated light output of the powder, wherein the powder is hydrated at 75% relative-humidity for 1 hour followed by annealing at 220° C. for two hours in air, and followed by hydration for 10 minutes at 75% relative humidity.

29. The process of claim 28, further comprising
sieving the storage phosphor powder to a grain size of less than 50 microns; and
adding a two-part epoxy to the sieved storage phosphor powder to create the paint.

30. The process of claim 29, wherein the paint is spread onto a substrate and dried at room temperature in atmosphere.

* * * * *